United States Patent
Radhakrishnan et al.

(10) Patent No.: US 8,962,771 B2
(45) Date of Patent: Feb. 24, 2015

(54) REACTIVE ISOCYANATE-TERMINATED PREPOLYMERS FOR BINDER APPLICATIONS

(75) Inventors: Blndu Radhakrishnan, Lake Jackson, TX (US); William Aaron Koonce, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 176 days.

(21) Appl. No.: 13/698,041

(22) PCT Filed: May 26, 2011

(86) PCT No.: PCT/US2011/038072
§ 371 (c)(1),
(2), (4) Date: Nov. 14, 2012

(87) PCT Pub. No.: WO2011/156144
PCT Pub. Date: Dec. 15, 2011

(65) Prior Publication Data
US 2013/0066023 A1    Mar. 14, 2013

Related U.S. Application Data

(60) Provisional application No. 61/353,921, filed on Jun. 11, 2010.

(51) Int. Cl.
| | | |
|---|---|---|
| C08L 53/00 | (2006.01) |
| C08L 53/02 | (2006.01) |
| C08L 9/06 | (2006.01) |
| C08L 23/08 | (2006.01) |
| C08L 75/04 | (2006.01) |
| C08L 75/08 | (2006.01) |
| C08G 18/10 | (2006.01) |
| C08L 21/00 | (2006.01) |

(52) U.S. Cl.
CPC ............... *C08G 18/10* (2013.01); *C08L 75/04* (2013.01); *C08L 21/00* (2013.01)
USPC .......... 525/454; 525/92 C; 525/111; 525/127; 525/130; 525/453; 525/460

(58) Field of Classification Search
None
See application file for complete search history.

(56) References Cited

U.S. PATENT DOCUMENTS

| | | | | |
|---|---|---|---|---|
| 3,316,220 | A | * | 4/1967 | Ramos ........................... 528/62 |
| 3,718,624 | A | | 2/1973 | Rustad |
| 3,980,597 | A | * | 9/1976 | Shihadeh ....................... 524/705 |
| 4,053,537 | A | | 10/1977 | Ruprecht |
| 4,082,703 | A | * | 4/1978 | Duffy et al. ..................... 521/54 |
| 4,243,625 | A | * | 1/1981 | Burge ............................ 264/120 |
| 4,820,368 | A | * | 4/1989 | Markevka et al. .......... 156/307.3 |
| 5,631,318 | A | * | 5/1997 | Ito et al. ......................... 524/590 |
| 5,705,547 | A | | 1/1998 | Richards |
| 6,743,484 | B2 | | 6/2004 | Ott |
| 2009/0264558 | A1 | | 10/2009 | Kramer |
| 2010/0009196 | A1 | | 1/2010 | Kramer |

FOREIGN PATENT DOCUMENTS

| | | |
|---|---|---|
| GB | 2205847 B | 12/1988 |
| WO | 2009/094295 A | 7/2009 |

OTHER PUBLICATIONS

Industrial and Engineering Chemistry, vol. 50, No. 6, "Epoxy Plasticizers-Stabilizers," Jun. 1958, two pages.*

* cited by examiner

*Primary Examiner* — Robert Sellers
(74) *Attorney, Agent, or Firm* — Gary C Cohn PLLC

(57) ABSTRACT

Elastomer composites are prepared by wetting particles of a natural or synthetic rubber with a liquid one-component moisture-curable resin composition and then exposing the wetted particles to moisture to cure the resin composition. The moisture-curable resin composition comprises (a) an isocyanate-terminated polyurethane prepolymer having an isocyanate content of from 0.5 to 12% by weight and (b) from 1 to 30%, based on the combined weight of components (a) and (b), of an epoxide or lactone compound having a molecular weight of from about 70 to about 1000 and which is miscible in the prepolymer at the relative proportions thereof that are present. In addition, the composition contains no more than 0.1% by weight of compounds having a primary or secondary amino group.

16 Claims, No Drawings

REACTIVE ISOCYANATE-TERMINATED PREPOLYMERS FOR BINDER APPLICATIONS

This application claims benefit of U.S. Provisional Patent Application No. 61/353,921, filed 11 Jun. 2010.

The present invention relates to a reactive isocyanate-terminated prepolymer that is useful for binder applications, especially for producing rubber composites such as playground surfaces, carpet tiles, gaskets and similar products.

Elastomeric surfaces are often prepared by mixing rubber crumb with a binder material, and then curing the binder material to form a composite. Polyurethanes are commonly used as the binder material, because of their elastomeric properties, curing characteristics and ability to bond well to the rubber crumb. Polyurethane binders can be two-component types as described in DE 19 55 267 and GB 1,373,923 and GB 1,359,761 or one-component materials such as described in GB 1,384,619 and GB 1,294,017. The one-component polyurethane binders contain an isocyanate-terminated prepolymer. Curing is typically achieved through a reaction of the terminal isocyanate groups with water, which often is provided in the form of atmospheric moisture. One-component systems are often favored by their ease of use, as it is not normally necessary to perform metering or mixing steps in the field in order to produce a curable binder composition.

The viscosity of the isocyanate-terminated prepolymer is an important consideration. If the viscosity is too high, it is difficult to mix the prepolymer uniformly with the rubber crumb material. This leads to inconsistencies in the product that result from polyurethane-rich regions and polyurethane-poor regions (where the rubber crumb particles may not be adequately bound together). If the viscosity is too low, the prepolymer will run off of the crumb particles, which again leads to inconsistencies in the product, including areas of inadequate bonding between the rubber crumb particles.

The factors that affect the prepolymer viscosity include the equivalent weights and functionality of the polyols and the isocyanates, the isocyanate content of the prepolymer, and the like. Although these parameters may be manipulated in a given case to adjust the viscosity to a needed level, it must be kept in mind that these parameters also affect the curing characteristics of the prepolymer and the physical properties of the resulting polyurethane binder. Therefore, although in principle there is the possibility of manipulating prepolymer equivalent weight, crosslink density and/or isocyanate functionality in order to come to a desirable viscosity, in practice these manipulations are usually quite constrained by the needed curing and physical property characteristics.

For this reason, the more usual approach to viscosity control is through the presence of a diluent. Dioctyl phthalate is a commonly used diluent for these applications, but it is facing regulatory pressures which are expected to limit its availability and use in these applications, especially in playground surfaces or other products which are expected to be in contact with small children. Another problem that is sometimes seen with the phthalate diluents is that they sometimes leach from the cured polymer into the surrounding environment.

In addition to the matter of viscosity, the binder must also be storage-stable. It should not separate into layers upon standing. The prepolymer should cure reasonably rapidly to form a binder that adheres well to the rubber particles.

Therefore, an alternative binder system for these composite systems is needed.

This invention is in one aspect a process for preparing an elastomeric composite, comprising wetting particles of a natural or synthetic rubber with a liquid one-component moisture-curable resin composition and then exposing the wetted particles to moisture under conditions that the resin composition cures to form a binder phase which adheres the rubber particles together, wherein the moisture-curable resin composition comprises (a) an isocyanate-terminated polyurethane prepolymer having an isocyanate content of from 0.5 to 12% by weight and (b) from 1 to 30%, based on the combined weight of components (a) and (b), of an epoxide or lactone compound having a molecular weight of from about 70 to about 1000 and which is miscible in the prepolymer at the relative proportions thereof that are present, the composition containing no more than 0.1% by weight of compounds having a primary or secondary amino group.

In another aspect, this invention is a one-component binder composition comprising an isocyanate-terminated polyurethane prepolymer having an isocyanate content of from 0.5 to 12% by weight having dissolved therein (b) from 1 to 30%, based on the weight of the prepolymer, of an epoxide or cyclic lactone compound having a molecular weight of from about 70 to about 1000, the composition containing no more than 0.1% by weight of compounds having a primary or secondary amino group. The binder composition may contain other, optional materials, including, for example, a catalyst for the reaction of isocyanate groups with water. Any such catalyst is preferably a delayed-onset catalyst that provides a useful open time to allow the binder composition to be mixed with rubber particles before curing to a high viscosity material.

The presence of the epoxy or lactone compound has been found to very effectively reduce the viscosity of the isocyanate-terminated prepolymer. The amount that is used can be selected to tailor the viscosity of the prepolymer composition for specific applications, or even for specific temperature conditions under which the composition is expected to be used. The latter advantage allows the viscosity of the binder composition to be adjusted in response to seasonal conditions, which is an important advantage for outdoor installations, as is often the case with respect to playgrounds and playfields. In addition, the epoxy or cyclic lactone compound tends to resist separating from the cured binder composition because, it is believed, the epoxy or lactone groups can react with the isocyanate groups during the conditions of the curing reaction and therefore bind the epoxy or lactone compound into the cured polymer structure. Surprisingly, this reaction does not occur to any significant extent during normal storage conditions, in the absence of moisture or other compound that can react rapidly with the prepolymer. Because of this, the composition is very storage-stable.

The moisture-curable resin composition includes at least one isocyanate-terminated prepolymer that has an isocyanate content of from 0.5 to 12% by weight. The isocyanate content is preferably from 3 to 10% by weight. The prepolymer may contain, on average, from about 1.5 to about 6, preferably from 1.8 to about 4, isocyanate groups per molecule. In some embodiments, the prepolymer may contain an average of from about 1.8 to about 2.5 isocyanate groups per molecule.

The prepolymer is a reaction product of one or more polyols and an excess of at least one polyisocyanate. At least one of the polyols has a hydroxyl equivalent weight of at least 500 and preferably at least 800. The equivalent weight of this polyol may be as high as 3000 or more. It may contain from two to four hydroxyl groups per molecule, and preferably contains two or three, especially two, hydroxyl groups per molecule. This polyol is suitably a hydroxyl-terminated polybutadiene homopolymer or copolymer, or a polymer or copolymer of a polymerizable aliphatic cyclic ether such as ethylene oxide, propylene oxide, 1,2-butylene oxide, tetramethylene oxide and the like. Polymers and copolymers of propylene oxide are preferred. A suitable copolymer of propylene oxide is a random copolymer of propylene oxide and ethylene oxide in which the copolymer contains from 0.5 to 25% by weight of polymerized ethylene oxide. Another suitable copolymer is a block copolymer of propylene oxide and ethylene oxide, in which the polymerized ethylene oxide forms terminal groups that constitute from 0.5 to 25% by weight of the block copolymer.

In addition to the foregoing polyol, a low equivalent weight polyol or mixture thereof may be used to prepare the prepolymer. Such a low equivalent weight polyol may have a hydroxyl equivalent weight of from 30 to 499, preferably from 30 to 150. This material may have from two to four or more hydroxyl groups per molecule, and preferably has two or three hydroxyl groups per molecule. Examples of suitable low equivalent weight polyols include ethylene glycol, poly(ethylene glycol)s having a degree of polymerization of up to 10, preferably up to 4, 1,2-propylene glycol, 1,3-propylene glycol, poly(propylene glycol)s having a degree of polymerization of up to 10, preferably up to 4, cyclohexanedimethanol, neopentyl glycol, 1,4-butanediol, glycerine, trimethylolpropane, trimethylolethane, pentaerythritol, triethanolamine, and alkoxylates of any of the foregoing.

The polyisocyanate used to make the prepolymer may be an aliphatic polyisocyanate or an aromatic polyisocyanate, or mixtures thereof. Suitable aliphatic polyisocyanates include hexamethylene diisocyanate and isophorone diisocyanate. Preferred are aromatic polyisocyanates including toluene diisocyanate, methylene diphenylisocyanate (MDI), including any of the various isomers thereof, and polymethylene polyphenylisocyanate (crude MDI).

In a preferred embodiment the aromatic polyisocyanate is an isocyanate mixture that contains 2-ring methylene diphenylisocyanate (MDI) isomers in at least about 40, preferably at least 50 and more preferably at least 60 weight percent of total isocyanate present. Preferably the MDI contains the 2,4'- and 4,4'-methylene diphenylisocyanate isomers in a molar ratio of from about 10:90 to about 90:10, preferably from about 20:80 to about 80:20, more preferably in from about 20:80 to about 70:30. The balance of the isocyanate mixture when not methylene diphenylisocyanate can comprise toluene diisocyanate, hexamethylene diisocyanate, isophorone diisocyanate, polymethylene polyphenylisocyanate, carbodiimide or allophonate or uretonimine adducts of methylene diphenylisocyanate and mixtures thereof. Preferred isocyanates to make up the balance of the composition are polymethylene polyphenylisocyanate, and carbodiimide, allophonate or uretonimine adducts of methylene diphenylisocyanate.

The prepolymer is conveniently prepared by bringing the polyol(s) and polyisocyanate(s) together, with the polyisocyanate(s) in excess, and allowing them to react until a constant isocyanate content is obtained. Ratios of components are selected so that the prepolymer will have an isocyanate content as described before, after all the hydroxyl groups have been consumed. Reaction conditions typically will include an elevated temperature such as from 40 to 120° C. A polyurethane catalyst as described below may be present to speed the reaction. The prepolymer-forming reaction is preferably conducted in the substantial absence of water. An inert atmosphere such as nitrogen may be present during the reaction.

The prepolymer is blended with at least one epoxide or lactone compound. The epoxide or lactone compound suitably has a molecular weight of at least 70, preferably at least 75, up to 1000, preferably up to about 500. A more preferred molecular weight is from about 85 to about 300, and a still more preferred molecular weight is from about 85 to about 200. The epoxide or lactone compound preferably has a boiling temperature of at least 50° C. and more preferably at least 80° C. The epoxide or lactone compound is miscible in the prepolymer at the relative proportions that are present in the moisture curable composition. By "miscible" it is meant that the prepolymer and the epoxide or lactone, when blended together, form a visually uniform mixture which does not separate into layers upon standing at 25° C. for 24 hours.

Suitable epoxide compounds have at least one oxirane ring per molecule, and may contain two or more such rings. The epoxide compound may contain exactly two oxirane rings. The epoxide compound may contain aromatic groups, but is preferably aliphatic. Examples of suitable epoxide compounds include glycidyl ethers of aliphatic, cycloaliphatic or aliphatic monols or polyols that contain from 2 to 20, preferably from 3 to 12 carbon atoms. Also suitable are epoxidized vegetable oils or alkyl ($C_1$-$C_4$) esters of epoxidized fatty acids.

Specific examples of suitable epoxide compounds include butanediol diglycidyl ether; butanediol monoglycidyl ether; 1,2- or 1,3-propanediol diglycidyl ether; 1,2- or 1,3-propanediol monoglycidyl ether; mono- or diglycidyl ethers of poly(propylene oxide)monols or diols that have a molecular weight of up to about 400, preferably up to about 200 and more preferably up to 100; mono- or diglycidyl ethers of poly(ethylene oxide)monols or diols that have a molecular weight of up to about 400, preferably up to about 200 and more preferably up to 100, epoxidized vegetable oil; methyl esters of epoxidized vegetable oil fatty acids and mono- or diglycidyl ethers of bisphenol compounds such as bisphenol-A, bisphenol-F and the like.

Specific examples of lactone compounds include butyrolactone, valerolactone, caprolactone, and the like.

The epoxide or lactone compound may constitute from 1 to 30, preferably from 2 to 10 and more preferably from 2 to 5 percent of the combined weights of the prepolymer and the epoxide or lactone compound.

Mixtures of two or more epoxide compounds, of two or more lactone compounds, or a mixture of one or more epoxide compounds with one or more lactone compounds can be used.

A moisture-curable resin composition is formed by blending the prepolymer and the epoxide and/or lactone compounds. This is normally performed by simple mixing at ambient or slightly elevated temperatures. Conditions that promote the reaction of the isocyanate groups of the prepolymer with the epoxide or lactone compound should be avoided.

The moisture-curable resin composition may contain additional ingredients if necessary or desirable for a particular application. These may include, for example, a catalyst for the reaction of isocyanate groups with water. Other ingredients that may be present include, for example, fillers, colorants, surfactants, and the like. However, the moisture-curable resin composition should be substantially devoid of materials that contain primary or secondary amino groups.

The moisture-curable resin composition should be substantially devoid of materials that can react with polyisocyanate groups at temperatures below about 40° C. Compounds containing primary or secondary amino groups should constitute no more than 0.1%, preferably no more than 0.05% by weight of the moisture-curable resin composition. It is most preferred that the moisture-curable resin composition is devoid of compounds having primary or secondary amino groups. Similarly, the moisture-curable resin composition should contain no more than 1%, preferably no more than 0.5%, and more preferably no more than 0.25% by weight of compounds that contain hydroxyl or thiol groups. The moisture-curable resin composition is most preferably devoid of compounds that contain hydroxyl or thiol groups. Until such time as it is desired to cure the moisture-curable resin composition, it should contain less than 0.25% and preferably less than 0.1% by weight water, to prevent premature curing and promote storage stability.

Suitable catalysts include those described by U.S. Pat. No. 4,390,645 and in WO 02/079340, both incorporated herein by reference. Representative catalysts include tertiary amine and phosphine compounds, chelates of various metals, acidic metal salts of strong acids; strong bases, alcoholates and phenolates of various metals, salts of organic acids with a variety of metals, organometallic derivatives of tetravalent tin, trivalent and pentavalent As, Sb and Bi, and metal carbonyls of iron and cobalt.

Tertiary amine catalysts are generally preferred. Among the tertiary amine catalysts are dimethylbenzylamine, 1,8-diaza (5,4,0)undecane-7, pentamethyldiethylenetriamine, dimethylcyclohexylamine, triethylene diamine, dimethyl ethyl amine, n-ethyl morpholine, N-alkyl dimethylamine compounds such as N-ethyl N,N-dimethyl amine and N-cetyl N,N-dimethylamine, N-alkyl morpholine compounds such as N-ethyl morpholine and N-coco morpholine, and the like. A preferred catalyst is 2,2'-dimorpholino diethyl ether.

The catalyst is used in catalytically sufficient amounts. For the preferred tertiary amine catalysts, a suitable amount is from about 1 to about 4 parts, especially from about 1.5 to about 3 parts, of tertiary amine catalyst(s) per 100 parts by weight of the moisture-curable resin composition.

Examples of fillers and pigments include calcium carbonate, titanium dioxide, iron oxide, chromium oxide, azo/diazo dyes, phthalocyanines, dioxazines, recycled rigid polyurethane foam and carbon black.

Examples of suitable surfactants include a wide range of organosilicone surfactants.

These additional ingredients, if used, can be blended into the prepolymer before, at the same time, or after it is mixed with the epoxide or lactone compound. Alternatively, these additional ingredients may be mixed with the epoxide or lactone compound prior to mixing with the prepolymer. As before, temperature conditions are selected so the isocyanate groups of the prepolymer do not react significantly with the epoxide and/or lactone compounds.

The moisture-curable composition is formulated to be liquid at 25° C., and is a liquid when used to wet the rubber particles.

A composite is formed by mixing the moisture-curable resin composition with particles of a natural or synthetic rubber, and curing the resin composition. The rubber particles may be, for example, a vulcanized rubber, a polyurethane elastomer, an elastomeric polymer or copolymer of a diene such as butadiene homopolymers or styrene-butadiene block copolymers, very low density ethylene-alpha-olefin copolymer. Virgin material can be used, but for cost reasons it is often preferably to use reclaimed material such as shredded or ground tires, tire tubes, polyurethane foam, gasket material, playgrounds, and the like. The elastomer particles suitably have a longest dimension of no greater than about 20 mm, preferably no greater than about 15 mm and more preferably no greater than about 10 mm. For convenience of handling and processing, it is preferred that the particles are at least 1 mm, and preferably at least 3 mm, in at least one dimension.

The ratios of the moisture-curable resin composition and the elastomeric particles can range from about 1:99 to about 50:50 by weight. A preferred ratio is from 3:97 to about 40:60. A still more preferred ratio is from 5:95 to about 25:75.

Mixing can be done in any convenient fashion that permits the surfaces of the elastomeric particles to become wetted with the prepolymer. The mixing step is generally conducted at a temperature of from about 0 to about 40° C., although higher temperatures can be used during the mixing step if desired. An advantage of this invention is that the epoxide or lactone compound is very efficient at reducing the viscosity of the moisture-curable resin composition, and for that reason it is not usually necessary to heat the prepolymer substantially in order to reduce the viscosity enough to mix it easily with the elastomeric particles.

Curing is performed by exposing the resulting mixture of particles and moisture-curable resin composition to moisture. This is mainly done in at least two ways. In one approach, the moisture is simply atmospheric moisture, which comes into contact with the mixture and reacts with the isocyanate groups. In the other main approach, liquid water and/or steam is added into the mixture of particles and moisture-curable resin composition. In the latter case, the water can be mixed with the moisture-curable resin composition or with the elastomeric particles just before those components are themselves combined, or water can be added after the elastomeric particles have been wetted with the moisture-curable resin composition.

Curing can be performed at ambient temperature, or at some elevated temperature, such as up to 80° C.

In certain applications, such as playground or other outdoor installations, the elastomeric particles wetted with the moisture-curable composition are spread upon the ground, leveled and smoothed, and then allowed to cure at ambient temperature, typically with atmospheric moisture. Water may be sprayed onto the spread mixture if desired or necessary (as may be the case in a dry climate or under high temperature conditions) in order to speed the cure. In installations of this type, a certain amount of open time is needed, so that the mixture of elastomeric particles and moisture-curable resin composition remains workable long enough for the mixing, spreading, leveling and smoothing steps can be performed.

In another curing approach, the particles wetted with the moisture-curable composition are transferred to a large drum mold, where the curing step is performed. In this case, it is more common to add liquid water or steam to the wetted particles, to promote a faster cure. The mold may be heated if desired to speed the cure in this type of application. Upon completion of the cure, the cured mass is removed from the mold, and then can be spirally cut or shaved to form mats of a desired thickness. The mats can be fabricated further to produce a variety of articles such as gaskets, gymnasium mats, carpet underlayment, or other sealing or cushioning products.

A third curing approach is to cure the particles wetted with the moisture-curable composition in a mold whose internal dimensions match those needed of the final product. The mold may contain a substrate to which the resulting cushion is to be attached, as is the case in producing cushion-backed carpet tile. In this case, water or steam can be added to the wetted particles to speed the cure, and the mold may be heated for the same reason.

In any of these curing approaches, the wetted particles may be more or less tightly compacted. Higher compaction leads to a smaller void volume, a higher density product and typically a firmer product. Less compaction can lead to greater void volume, lower product densities and a softer product. Void volume is also affected by the ratios of moisture-curable resin composition and elastomeric particles; with higher ratios (relatively more of the resin composition) typically leading to lower void volumes, as greater quantities of the liquid prepolymer also the spaces between the particles to become more completely filled. Void volume in the final product may be from zero to 85%, but are more typically no greater than 30%.

During the curing step, the epoxide or lactone compound is believed to at least partially react with isocyanate groups on the prepolymer and thus become at least partially bound into the polymer network. Although the invention is not limited to any theory, it is believed that when isocyanate groups first react with water, a primary amine group is formed. This primary amine group can then react with another isocyanate group to extend the polymer chain, but some of the time they will instead react with an oxirane or lactone group, and form a bond thereto. Heat to drive this reaction is believed to be provided in some cases by the exotherm from the water-isocyanate reaction, and in other cases can be provided by heating the mixture as it cures. In this manner the epoxide or lactone compound becomes bonded into the polymer network. Polyepoxides have the possibility of reacting polyfunctionally with the prepolymer, and thus extend the growing polymer chain, but it is possible that not all of the epoxide groups will react. It is also possible that only some portion of the epoxide or lactone compound(s) will react, and that some amount of free (unreacted) epoxide or lactone compound(s) will remain in the cured composite.

The following examples are given to illustrate the invention and should not be interpreted as limiting in anyway. Unless stated otherwise, all parts and percentages are given by weight.

Examples 1 and 2

An isocyanate-terminated prepolymer is prepared by mixing 61.2 parts of a 2000 molecular weight poly(propylene oxide)diol, 31 parts of a 50:50 by weight mixture of the 2,4'- and 4,4'-isomers of MDI and 7.7 parts of 2.7 functional, 134 equivalent weight polymeric MDI, and heating the mixture until a constant isocyanate content of 10% is achieved.

The resulting prepolymer has a viscosity of about 2.6 Pa·s at 25° C. and about 0.8 Pa·s at 45° C. When 100 parts of the prepolymer are blended with 3 parts of 1,4-butanedioldiglycidyl ether and 0.1 part of 2,2'-dimorpholinodiethylether (Example 1), the viscosity is reduced to about 2.3 Pa·s at 25° C. and about 0.7 Pa·s at 45° C. When 100 parts of the prepolymer are blended with 5 parts of 1,4-butanedioldiglycidyl ether and 0.1 part of 2.2'-dimorpholinodiethylether (Example 2), the viscosity is reduced to about 1.7 Pa·s at 25° C. and about 0.6 Pa·s at 45° C.

Examples 1 and 2 are separately mixed with 0.5 parts of water and allowed to cure at ambient temperature. Open time is determined as the time from mixing in the water until visible indications of curing are seen. Cure time is the time needed for the mixture to cure to a tack-free state. For comparison, open time and cure time are determined for the prepolymer without the 1,4-butandediol diglycidyl ether (Comparative Sample A). For further comparison, duplicate samples of the prepolymer are mixed with 3 parts (Comparative Sample B) or 5 parts (Comparative Sample C) of dioctyl phthalate, and open and cure times are measured. Results are as reported in Table 1 following.

Tensile strength and elongation for the cured polymers are measured according to ASTM D1708. Results are as indicated in Table I.

TABLE I

| Test | Example or Comparative Sample No. | | | | |
|---|---|---|---|---|---|
| | 1 | 2 | A* | B* | C* |
| Diluent type[1] | BDDGE | BDDGE | None | DOP | DOP |
| Diluent amount, % | 3 | 5 | 0 | 3 | 5 |
| Open time, hours | 2 | 3 | 2 | 2 | 2 |
| Cure time, hrs | 4 | 5 | 5 | 5.5 | 6 |
| Tensile strength, N/mm$^2$ | 38 | 25 | 39 | ND | ND |
| Elongation, % | 170 | 136 | 153 | ND | ND |

*Not an example of this invention.
ND—not determined.
[1]BDDGE is butanediol diglycidyl ether; DOP is dioctyl phthalate.

The results indicated in Table 1 show that the presence of butanediol diglycidyl ether permits the prepolymer to cure rapidly after a long open time. Compared to dioctyl phthalate, cure times are faster at equivalent diluent loadings, without hurting open times. At the 3% level, the butanediol diglycidyl ether has little effect on tensile or elongations, the differences in value from the controls being within a standard deviation on these tests. This is somewhat unexpected, as the presence of the diluent is expected to decrease tensile properties at least. At the 5% level, some loss of tensile and elongation is seen, as is expected when a diluent is provided in the system.

Examples 3 and 4

An isocyanate-terminated prepolymer is prepared by mixing 30 parts of a 2000 molecular weight poly(propylene oxide)diol, 33 parts of a 6000 molecular weight ethylene oxide-capped poly(propylene oxide)triol, 31 parts of a 50:50 by weight mixture of the 2,4'- and 4,4'-isomers of MDI and 6 parts of a 2.7 functional, 134 equivalent weight polymeric MDI, and heating the mixture until a constant isocyanate content of 10% is achieved.

The resulting prepolymer has a viscosity of about 3.5 Pa·s at 25° C. and about 1.2 Pa·s at 45° C. When 100 parts of the prepolymer are blended with 3 parts of 1,4-butanediolgiglycidyl ether and 0.4 part of 2,2'-dimorpholinodiethylether (Ex. 3), the viscosity is reduced to about 2.7 Pa·s at 25° C. and about 1.0 Pa·s at 45° C. When 100 parts of the prepolymer are blended with 5 parts of 1,4-butanediolgiglycidyl ether and 0.4 part of 2.2'-dimorpholinodiethylether (Example 4), the viscosity is reduced to about 2.3 Pa·s at 25° C. and about 1.0 Pa·s at 45° C.

Examples 3 and 4 are separately mixed with 0.5 parts of water and allowed to cure at ambient temperature. Open time is determined as the time from mixing in the water until visible indications of curing are seen. Cure time is the time needed for the mixture to cure to a tack-free state. For comparison, open time and cure time are determined for the prepolymer without the 1,4-butandediol diglycidyl ether (Comparative Sample D). For further comparison, duplicate samples of the prepolymer are mixed with 3 parts (Comparative Sample E) or 5 parts (Comparative Sample F) of dioctyl phthalate, and open and cure times are measured. Results are as reported in Table 1 following.

Tensile strength and elongation for the cured polymers are measured according to ASTM D1708. Results are as indicated in Table II.

TABLE II

| Test | Example or Comparative Sample No. | | | | |
|---|---|---|---|---|---|
| | 3 | 4 | D* | E* | F* |
| Diluent type[1] | BDDGE | BDDGE | None | DOP | DOP |
| Diluent amount. % | 3 | 5 | 0 | 3 | 5 |
| Open time, hours | 0.5 | 0.5 | 0.5 | 1.0 | 0.5 |
| Cure time, hrs | 1.5 | 1.25 | 2.0 | 3.0 | 4.0 |
| Tensile strength, N/mm$^2$ | 20 | 16 | 27 | ND | ND |
| Elongation, % | 388 | 371 | 400 | ND | ND |

*Not an example of this invention.
ND—not determined.
[1]BDDGE is butanediol diglycidyl ether; DOP is dioctyl phthalate.

The results indicated in Table II again show that the presence of butanediol diglycidyl ether permits the prepolymer to cure rapidly after a long open time. Note that this system is more reactive than Examples 1 and 2 due to the increased catalyst loading. The prepolymer in these experiments is more highly branched as well. The butanediol diglycidyl ether has no effect on open time and at most a small effect on cure time. By contrast, dioctyl phthalate in these experiments has a significant effect on cure time at both the 3% and 5% levels. The butanediol diglycidyl ether a small adverse effect on tensile strength, as expected from the presence of a diluent.

What is claimed is:

1. A process for preparing an elastomeric composite, comprising wetting particles of a natural or synthetic rubber with a liquid one-component moisture-curable resin composition and then exposing the wetted particles to moisture under conditions that the resin composition cures to form a binder phase which adheres the rubber particles together, wherein the moisture-curable resin composition comprises (a) an isocyanate-terminated polyurethane prepolymer having an isocyanate content of from 0.5 to 12% by weight and (b) from 1 to 30%, based on the combined weight of components (a) and (b), of an epoxide compound having a molecular weight of from about 70 to about 1000 and which is miscible in the prepolymer at the relative proportions thereof that are present, the composition containing no more than 0.1% by weight of compounds having a primary or secondary amino group and containing no more than 1% by weight of compounds that contain hydroxyl or thiol groups.

2. The process of claim 1, wherein the prepolymer has an isocyanate content of from 3 to 10% by weight.

3. The process of claim 2, wherein the epoxide compound has a molecular weight of from 85 to 300.

4. The process of claim 3, wherein the epoxide compound has a molecular weight of from 85 to 200.

5. The process of claim 2, wherein the moisture-curable resin composition contains from 2 to 10% by weight of the epoxide compound.

6. The process of claim 5, wherein the moisture-curable resin composition contains from 2 to 5% by weight of the epoxide compound.

7. The process of claim 2, wherein the epoxide compound is a glycidyl ether of an aliphatic, cycloaliphatic or aliphatic monol or polyol that contains from 2 to 20 carbon atoms.

8. The process of claim 7, wherein the epoxide compound is butanediol diglycidyl ether, butane diol monoglycidyl ether, 1,2- or 1,3-propane diol diglycidyl ether or 1,2- or 1,3-propane diol monoglycidyl ether.

9. The process of claim 2, wherein the elastomeric particles are wetted with the moisture-curable composition and then spread upon the ground, leveled and smoothed, and then allowed to cure at ambient temperature.

10. The process of claim 2, wherein the particles are wetted with the moisture-curable composition and transferred to a drum mold, liquid water or steam is added to the wetted particles, and the curing step is performed in the drum mold.

11. A one-component binder composition comprising an isocyanate-terminated polyurethane prepolymer having an isocyanate content of from 3 to 10% by weight having dissolved therein (b) from 1 to 30%, based on the weight of the prepolymer, of a glycidyl ether of an aliphatic, cycloaliphatic or aliphatic monol or polyol that contains from 2 to 20 carbon atoms having a molecular weight of from about 70 to about 1000, the composition containing no more than 0.1% by weight of compounds having a primary or secondary amino group and containing no more than 1% by weight of compounds that contain hydroxyl or thiol groups.

12. The binder composition of claim 11, wherein the epoxide compound has a molecular weight of from 85 to 300.

13. The binder composition of claim 12, wherein the epoxide compound has a molecular weight of from 85 to 200.

14. The binder composition of claim 11, wherein the moisture-curable resin composition contains from 2 to 10% by weight of the epoxide compound.

15. The binder composition of claim 14, wherein the moisture-curable resin composition contains from 2 to 5% by weight of the epoxide compound.

16. The binder composition of claim 11, wherein the epoxide compound is butanediol diglycidyl ether, butane diol monoglycidyl ether, 1,2- or 1,3-propane diol diglycidyl ether or 1,2- or 1,3-propane diol monoglycidyl ether.

* * * * *